United States Patent [19]

Kozierok et al.

[11] Patent Number: 5,026,240
[45] Date of Patent: * Jun. 25, 1991

[54] CHARGING DEVICE

[75] Inventors: Leon Kozierok; Robert A. Gallagher, both of Weston, Canada

[73] Assignee: Indalloy, Division of Indal Limited, Weston, Canada

[*] Notice: The portion of the term of this patent subsequent to Jun. 30, 2004 has been disclaimed.

[21] Appl. No.: 271,699

[22] Filed: Nov. 16, 1988

Related U.S. Application Data

[63] Continuation of Ser. No. 39,156, Apr. 16, 1987, abandoned, which is a continuation-in-part of Ser. No. 705,214, Feb. 25, 1985, Pat. No. 4,676,742.

[51] Int. Cl.$^5$ .............................................. B65G 1/00
[52] U.S. Cl. .................................. 414/300; 414/198; 432/143; 432/152
[58] Field of Search ................ 432/58, 143, 152, 153, 432/158, 176, 192; 266/901; 406/88, 90; 110/222, 223, 224; 100/98; 414/198, 300

[56] References Cited

U.S. PATENT DOCUMENTS

| | | | |
|---|---|---|---|
| 1,844,635 | 2/1932 | Coller | 406/88 |
| 2,624,565 | 1/1953 | Kompart | 266/901 |
| 2,848,820 | 8/1958 | Wallin et al. | 406/88 |
| 2,882,097 | 4/1959 | Hamren | 406/88 |
| 3,141,401 | 7/1964 | Lindemann et al. | 100/98 |
| 3,758,267 | 9/1973 | Berk | 266/901 |
| 4,445,849 | 5/1984 | Bouille | 266/901 |
| 4,504,177 | 3/1985 | Lagneau | 406/88 |

Primary Examiner—Henry C. Yuen
Attorney, Agent, or Firm—Neil H. Hughes; Ivor M. Hughes

[57] ABSTRACT

A charging device suitable for use in processing scrap comprising a charge box open at the top, a pusher, and a moveable plate supported for sliding movement from a position with the charge box open to a position to close the charge box; the charge box having a top, bottom, front and rear, the charge box for receiving scrap through the top thereof and being in communication at the front thereof with an apparatus for handling scrap; the scrap being pushed by the pusher for pushing the contents of the charge box into the apparatus for handling scrap, the pusher being moveable from a position at the rear of the charge box remote the apparatus for handling scrap to a position at the front of the charge box proximate the apparatus for handling scrap; the pusher being supported by a support frame fully enclosing the pusher, when the pusher is remote the scrap receiving process; the moveable plate having a shearing edge at its leading edge and for co-operative movement with the pusher, the moveable plate being moveable from a position wherein the shearing edge is proximate the rear of the charge box to a position wherein the shearing edge is proximate the front of the charge box adjacent the apparatus for handling scrap, whereby when scrap is received within the charge box, the moveable plate advances to shear any excess scrap extending through the top of the charge box and thereby effecting co-operative motion of the pusher to push the scrap into the apparatus for handling scrap.

26 Claims, 12 Drawing Sheets

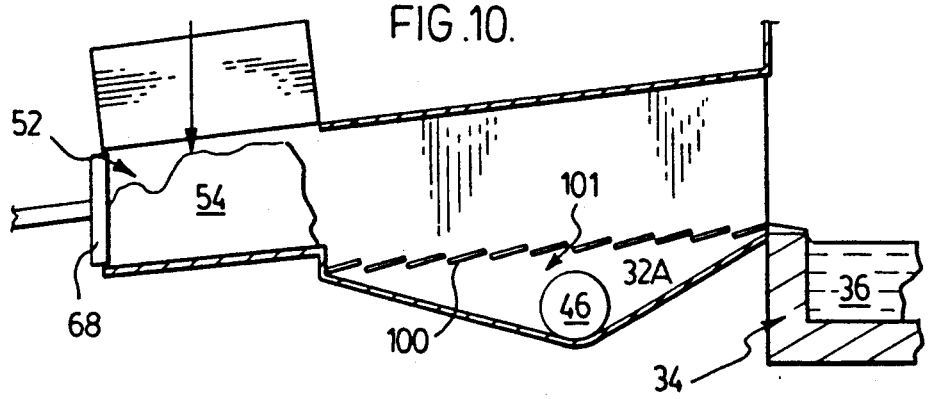
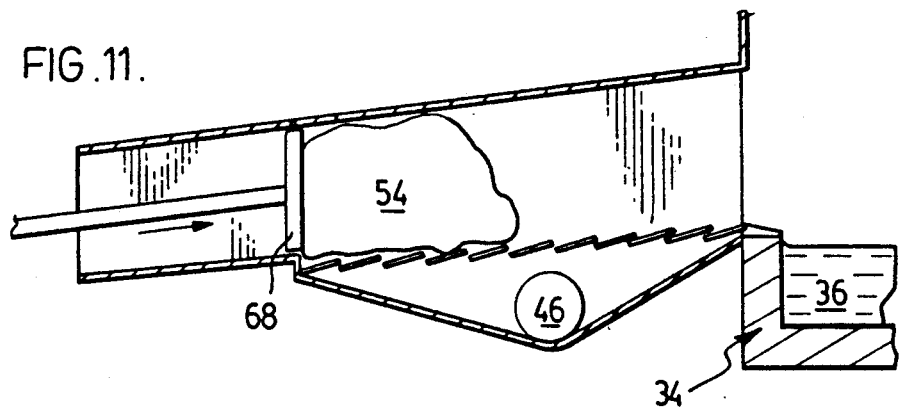
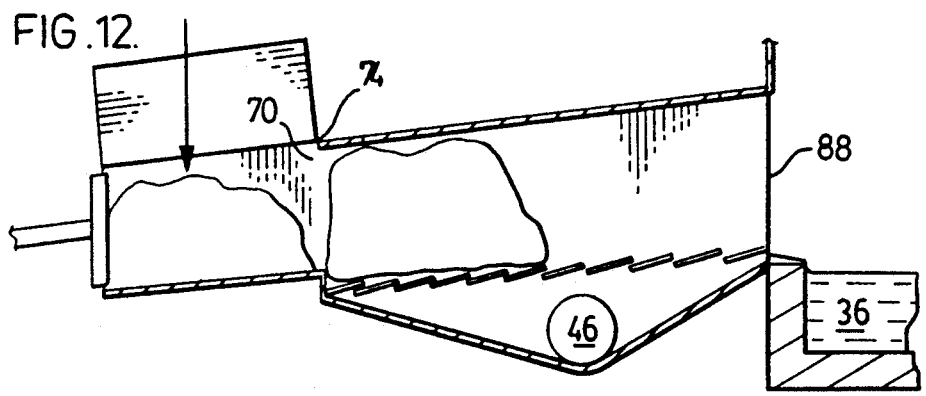
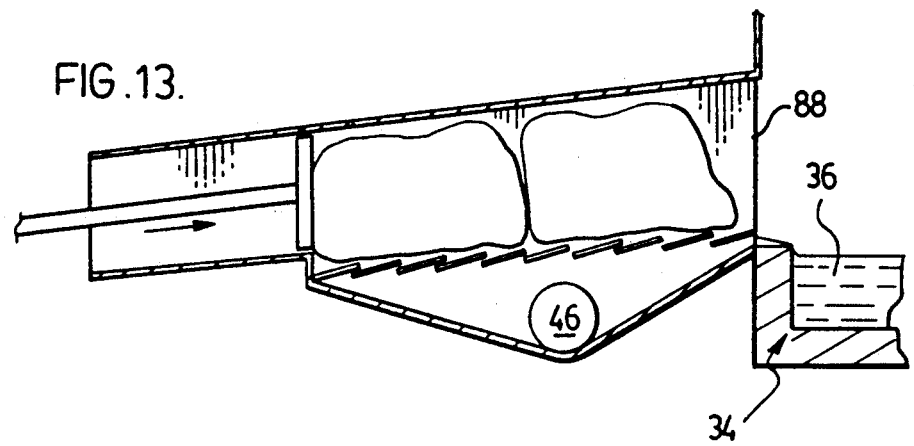

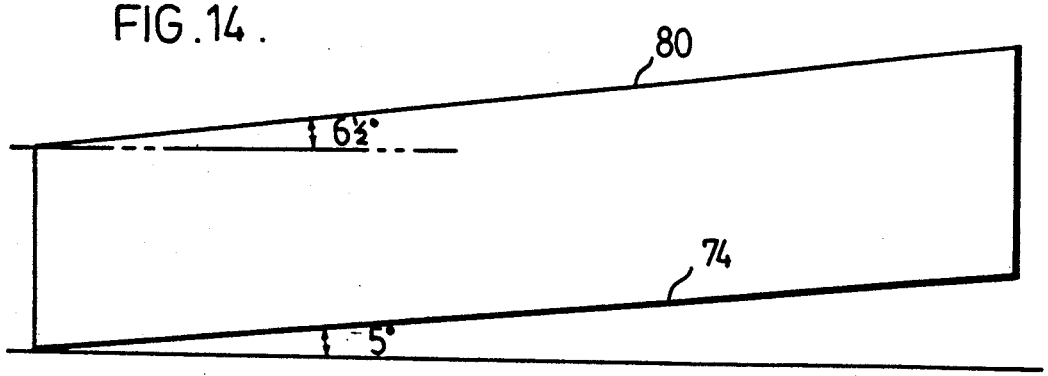
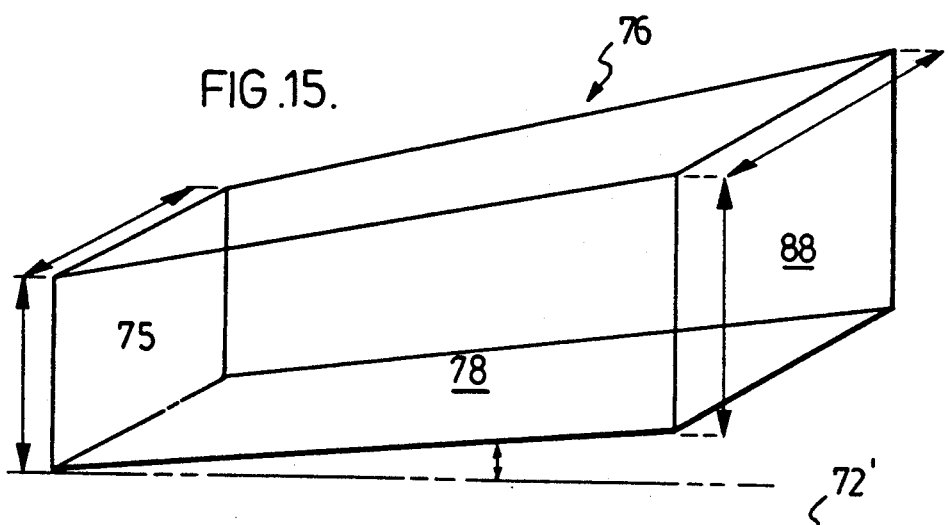
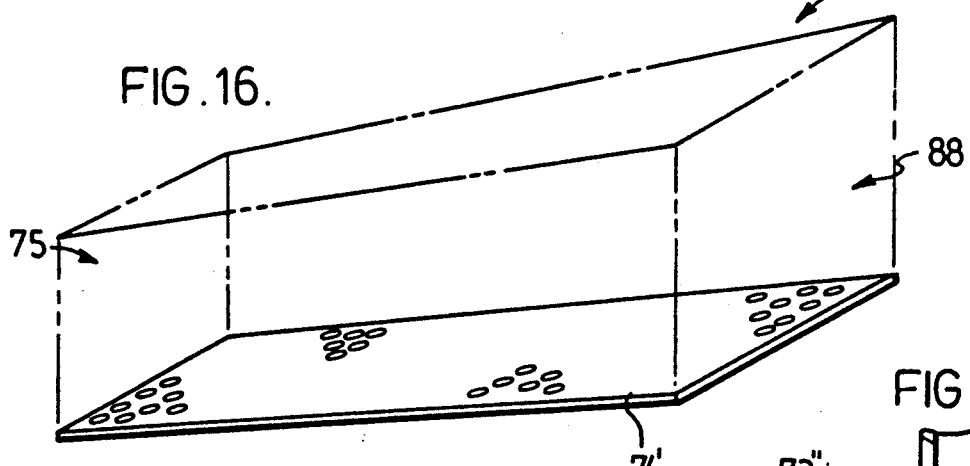
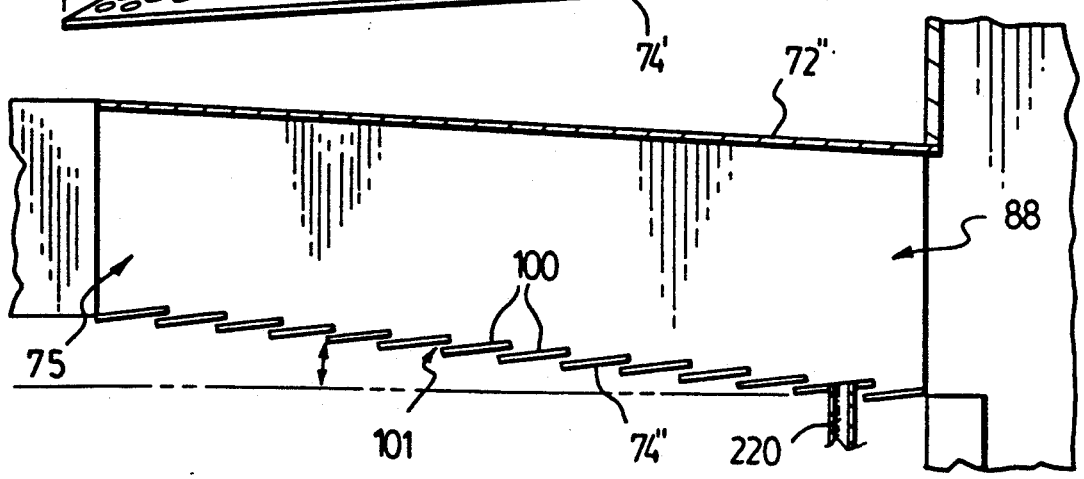

CHARGING DEVICE

This application is a continuation of Ser. No. 07/039,156, filed 4/16/1987, now abandoned which is a continuation-in-part application of U.S. application Ser. No. 06/705,214 filed Feb. 25, 1985 now U.S. Pat. No. 4,676,742.

FIELD OF INVENTION

This invention relates to an improved charge box suitable for use in conjunction with a preheater in cooperation with gas fired reverberatory melting furnaces for recycling aluminum scrap and other scrap metals.

BACKGROUND OF THE INVENTION

In applying the aforementioned invention, it has been determined that there are certain disadvantages in the present state of charging devices and specifically for the preheater. The conventional type box with a lid would lift as the pusher or ram was advanced and buckle, thus negating contact with the limit or pressure switch provided. Also the charge box had to be continually inspected and reloaded by hand to avoid the jamming of materials not held accurately below the cover plane when closed. Further, scraps of materials had been accumulating around the ram and jamming the ram causing friction between the ram and a support frame. This friction would cause the pusher or ram to go out of alignment and result in costly maintenance which would have to be repeated because of the inherent design problem.

When the scrap was loaded into the charge box the cover of course must be open. This allowed fumes used for preheating to escape and also allowed the introduction of cool air into the preheater.

U.S. Pat. No. 4,583,469 by Di Sabatino describes an incinerator having a charging device for moving waste materials into a combustion chamber. A fire door is raised to open the charging entrance and lowered to seal the charging entrance.

U.S. Pat. No. 3,141,401 by Lindemann et al describes a machine for preparing scrap metal for baling or shearing.

U.S. Pat. No. 4,526,413 by Williams describes a remote controlled unit for a grapple or clamshell bucket.

U.S. Pat. No. 4,381,872 by Hahn describes a similar device to that of U.S. Pat. No. 4,526,413.

Preheating of aluminum scrap prior to being fed into a gas or oil fired reverberatory furnace for processing is known to drive off moisture carried on the scrap. If the water is not driven off, explosive vaporization can occur when the scrap is introduced into the furnace. Such preheating also reduces the cost of processing of the metal by raising the temperature of the metal before its being introduced into the furnace.

In previous proposals, cold scrap was placed on a sill surrounding the well of the reverberatory furnace which carried the molten metal, before being pushed into the well to preheat the scrap and drive off the water. In some instances, a carriage was pushed into a position near the mouth of the furnace at the level of the sill to preheat the scrap on the carriage before being pushed onto the sill for more heating before introduction into the well.

In another proposal, scrap iron is pushed by pushers from step to step in a preheat area of a furnace before discharge into the furnace hearth (see Canadian Letters Patent 645,586).

In more recent proposals, preheating of scrap aluminum has been accomplished by applying heat generated by special burners or waste heat carried by the flue gases discharged up the stack. In U.S. Pat. No. 3,669,436, scrap metal carried in a container is preheated at a preheating station by waste gases passed through the bottom of the container up through the scrap. Thereafter, the contained scrap is discharged into the furnace. Of course, it will be appreciated that such a proposal is costly (particularly for the amount of material that can be preheated) and complex. U.S. Pat. No. 3,424,445 discloses another approach where containers carrying scrap metal are moved on trucks in a gas tunnel carrying waste gases.

In more recent proposals, a rotary kiln has been used because of its compact size, adaptability to high capacity processing (unlike the proposals previously discussed) and, capability of achieving uniform heating of the aluminum scrap. However, rotary kiln applications are limited to smaller sized scrap (for example, chopped, crushed or shredded). Therefore the scrap (unless of small size) before preheating in the rotary kiln, must be shredded, comminuted or chopped into smaller pieces. If the aluminum scrap for example is merely compressed, water may be trapped and/or the metal scrap will not be preheated thoroughly. Furthermore, where comminuted, the preliminary processing requires the expenditure of additional energy and which processing results in about 1%-2% loss of metal. In preheating the small sized scrap metal in the rotary kiln, the kiln lifts and tumbles the scrap as flue gases are passed over and around the metal pieces.

In another proposal, small pieces of scrap metal (shredded cans, borings, turnings, extrusions, plates and small castings) are preheated also by the use of waste heat. In this proposal the preheater comprises a downwardly inclined chamber having an inclined bed of overlying spaced plates on the bottom thereof permitting flue gases to be passed into the hopper through the spaced plates to engage the pieces of scrap metal passing down through the inclined chamber to preheat the scrap metal. The preheated metal is discharged at a controlled flow rate (controlled by vibratory discharge) through an inclined discharge chute. The additional drawbacks with this process (over and above those previously described) include the jamming of the scrap metal in the chamber and the compaction of the small pieces of metal in the chamber as they pass through the chamber so that the flue gases do not touch all the scrap metal to fully preheat it.

Thus it is apparent that not one apparatus has been proposed which preheats large pieces of aluminum scrap metal without first requiring the cutting up of the large pieces or being cost prohibitive before processing in the reverberatory furnace.

Where compacted bundles of large pieces of aluminum scrap metal are brought in for processing into aluminum billets, they must be dealt with in such a way that no water is inadvertently introduced to the reverberatory furnace. To ensure water is eliminated, preheating is desireable. However, the preheating must be done at minimum cost with maximum efficiency.

It is therefore an object of this invention to provide an improved charge box preferably for use in conjunction with scrap metal handling and in one embodiment, an improved charge box and preheater.

It is a further object of the invention to provide a charge box which is considerably more reliable and requires less maintenance.

It is a further object of the invention to provide a charge box which is sturdy and will withstand continuous use.

Further and other objects of the invention will be realized by those skilled in the art from the following summary of the invention and detailed description of embodiments thereof.

SUMMARY OF THE INVENTION

According to one aspect of the invention, an improved preheater suitable for processing large pieces of scrap metal including large pieces of aluminum scrap metal, prior to being charged into a reverberatory furnace is provided, the preheater comprising, a charge box having a bottom for receiving scrap metal, a chamber having a bed, the chamber in communication with the charge box at one end and an exit at the other, a pusher for pushing the contents of the charge box into the chamber and thus pushing the contents of the chamber towards the exit, the chamber of uniform expanding dimensions, its one end in communication with the charge box towards the exit so as to permit the pushing of the scrap metal in the one direction away from the charge box to the exit without undue compression of the scrap metal or jamming of the scrap metal in the chamber, the bed having a plurality of openings therethrough for passing heated gases into the chamber for preheating the scrap and the bed being oriented from the charge box to the exit in a fixed position selected from a range of fixed positions between being fixed and being inclined slightly upwardly from the charge box to the exit to being fixed and being inclined slightly downwardly from the charge box to the exit and when the bed is fixed and inclined slightly downwardly from the charge box to the exit the bed carries a drain between the charge box and exit proximate the exit for draining any water falling from the scrap to the bed from the chamber.

In another embodiment the bed comprises a plurality of laterally extending plates one in front of another, each plate having a front edge closer the exit and a rear edge closer the charge box, the front edge of the plate immediately behind the plate closer the exit, overlying the rear edge of the plate closer the exit and vertically spaced therefrom to provide a plurality of laterally extending openings through the bed.

In one embodiment the plates are 6 inches (about 15.2 cm) in length from front to back and inclined upwardly in the bed so that a 1 inch rise (2.54 cm) is provided over the length of the plate (the bed is also inclined upwardly). The chamber is 6 inches (15.2 cm) wider and 6 inches (15.2 cm) higher at the exit end than the end proximate the charge box. At the charge box the dimensions of the chamber are 4 feet 6 inches (137 cm) wide (the bed) and 4 feet (122 cm) high. The chamber (in this embodiment) is 12 feet, 4 inches (376 cm) long.

Where the gases are injected through the bed, a gas chamber is provided below the bed for receiving the heated gases prior to their passage through the openings.

With the above apparatus, compacting of the metal (which expands as it is heated) and jamming are both minimized as the metal is moved through the chamber thereby maximizing passage of the heated gases through the scrap metal. Therefore, maximum removal of water from the scrap metal takes place all at minimum cost.

As is apparent, the openings in the chamber through which the heated gases are injected into the chamber must be smaller than the pieces of metal so that the metal will not poke through an opening and become caught or fall through.

According to another aspect of the invention, a charging device suitable for use in processing scrap is provided, the device comprising a charge box open at the top, a pusher, and a moveable plate supported for sliding movement from a position with the charge box open to a position to close the top of the charge box; the charge box having a top, bottom, front and rear, the charge box communication at the front thereof with an apparatus for handling scrap (for example, a preheater for preheating metal), the scrap being pushed by the pusher (for example, the apparatus for handling the scrap, the pusher preferably comprising a rectangular plate extending substantially vertically from the top to the bottom of the charge box and from one side to the other side of the charge box, and preferably being advanced by a hydraulic cylinder attached centrally to the pusher on the side of the pusher remote the charge box, the pusher being moveable from a position at the rear of the charge box remote the apparatus for handling scrap to a position at the front of the charge box proximate the apparatus for handling the scrap, the pusher and, where a hydraulic cylinder is used, the hydraulic cylinder preferably being supported by a support frame fully enclosing the pusher and the cylinder when used, the moveable plate having a shearing edge at its leading edge and for co-operative movement with the pusher, preferably the moveable plate being slideable within a track and moveable by a hydraulic cylinder, the moveable plate being moveable from a position wherein the shearing edge is proximate the rear of the charge box to a position whereat the shearing edge is proximate the front of the charge box adjacent the apparatus for handling the scrap, preferably the co-operative movement of the plate and the pusher being accomplished by the use of limit or pressure switches; whereby when scrap is received within the charge box, the moveable plate advances to shear any excess scrap extending through the top of the charge box and engages the co-operative motion of the pusher to push the scrap into the apparatus for handling the scrap.

According to another aspect of the invention, a charging device suitable for use in processing scrap is provided, the device comprising a charge box open at the top, a pusher, a moveable gate, and a moveable plate supported for sliding movement from a position with the charge box open to a position to close the charge box; the charge box having a top, bottom, front and rear, the charge box for receiving scrap through the top thereof, and being in communication at the front thereof with an apparatus for handling scrap (for example, a preheater for preheating metal); the scrap being pushed by the pusher (for example, a ram) for pushing the contents of the charge box into the apparatus for handling scrap, the pusher preferably comprising a rectangular plate extending substantially vertically from the top to the bottom of the charge box and from one side to the other side of the charge box and preferably being advanced by a hydraulic cylinder attached centrally to the pusher on the side of the pusher remote the charge box, the pusher being moveable from a position at the rear of the charge box remote the apparatus for handling scrap to a position at the front of the charge box proximate the apparatus for handling scrap, the pusher and where a hydraulic cylinder is used, the hydraulic cylinder being supported by a support frame fully enclosing the pusher and the cylinder when used, the charge box having disposed at the front thereof and inclined substantially vertically a gate having a bottom for co-operative movement with the pusher, the movement being from a position wherein the bottom of the gate is proximate the bottom of the charge box to a position wherein the bottom of the gate is proximate the top of the charge box preferably when the pusher is respectively remote the apparatus for handling scrap to a position when the pusher is proximate the apparatus for handling scrap metal, preferably the gate having a substantially vertically inclined hydraulic cylinder and frame therefor affixed proximate the front of the charge box proximate the apparatus for receiving scrap for the supported movement thereof, the moveable plate having a shearing edge at its leading edge and for co-operative movement with the pusher and the gate, preferably the moveable plate being slideable within a track and moveable by a hydraulic cylinder, the moveable plate being moveable from a position wherein the shearing edge is proximate the rear of the charge box to a position whereat the shearing edge is proximate the front of the charge box adjacent the apparatus for handling scrap, preferably the co-operative movement of the plate, the pusher, and the gate being accomplished by the use of limit or pressure switches; whereby when scrap is received within the charge box, the moveable plate advances to shear any excess scrap extending through the top of the charge box and engages the co-operative motion of the pusher, to push the scrap into the apparatus for handling scrap, and the gate which allows the scrap to enter the apparatus for handling scrap while preventing the exit of fumes therefrom.

According to yet another aspect of the invention, the process for handling may comprise a process for handling scrap wherein the scrap is scrap metal.

According to another aspect of the invention, a charging device suitable for use in processing scrap metal is provided, the device comprising a charge box open at the top, a pusher, and a moveable plate supported for sliding movement from a position with the charge box open to a position to close the charge box; the charge box having a top, bottom, front and rear, the charge box for receiving scrap metal through the top thereof and being in communication at the front thereof with an apparatus for handling scrap metal, the scrap metal being pushed by the pusher (for example, a ram) for pushing the contents of the charge box into the apparatus for handling scrap metal, and preferably thus pushing the contents of the apparatus towards the exit thereof, the pusher preferably comprising a rectangular plate extending substantially vertically from the top to the bottom of the charge box and from one side to the other side of the charge box, and preferably being advanced by a hydraulic cylinder attached centrally to the pusher on the side of the pusher remote the charge box, the pusher being moveable from a position at the rear of the charge box remote the apparatus for handling scrap metal to a position at the front of the charge box proximate the apparatus for handling scrap metal, the pusher and where a hydraulic cylinder is used, the hydraulic cylinder being supported by a support frame fully enclosing the pusher and the cylinder when used, the moveable plate having a shearing edge at its leading edge for co-operative movement with the pusher, preferably the moveable plate being slideable within a track and moveable by a hydraulic cylinder, the moveable plate being moveable from a position wherein the shearing edge is proximate the rear of the charge box to a position wherein the shearing edge is proximate the front of the charge box adjacent the apparatus for handling scrap metal preferably the co-operative movement of the plate and the pusher being accomplished by the use of limit or pressure switches; whereby when scrap metal is received within the charge box the moveable plate advances to shear any excess scrap extending through the top of the charge box and thereby engages co-operative motion of the pusher which pushes the scrap metal into the apparatus for handling scrap metal.

According to another aspect of the invention, a charging device suitable for use in processing scrap metal is provided, the device comprising a charge box, a pusher, a moveable gate, and a moveable plate supported for sliding movement from a position with the charge box open to a position to close the charge box, the charge box having a top, bottom, front and rear, the charge box for receiving scrap metal through the top thereof, and being in communication at the front thereof with an apparatus for handling scrap metal; the scrap metal being pushed by the pusher (for example, a ram) for pushing the contents of the charge box into the apparatus for handling scrap metal, and preferably thus pushing the contents of the apparatus towards the exit thereof, the pusher preferably comprising a rectangular plate expending substantially vertically from the top to the bottom of the charge box, and from one side to the other side of the charge box, and preferably being advanced by a hydraulic cylinder attached centrally to the pusher on the side of the pusher remote the charge box, the pusher being moveable from a position at the rear of the charge box remote the apparatus for handling scrap metal to a position at the rear of the charge box proximate the apparatus for handling scrap metal, the pusher and where a hydraulic cylinder is used, the hydraulic cylinder being supported by a support frame fully enclosing the pusher and the cylinder when used, the charge box having disposed at the front thereof and inclined substantially vertically a gate having a bottom for co-operative movement with the pusher, the movement being from a position wherein the bottom of the gate is proximate the bottom of the charge box to a position wherein the bottom of the gate is proximate the top of the charge box preferably when the pusher is respectively remote the apparatus for handling scrap metal to a position when the pusher is proximate the apparatus for handling scrap metal, preferably the gate having a substantially vertically inclined hydraulic cylinder and frame therefor affixed to the rear of the charge box proximate the apparatus for handling scrap metal for the supported movement thereof, the moveable plate having a shearing edge at its leading edge and for co-operative movement with the pusher and the gate, preferably the moveable plate being slideable within a track and moveable by a hydraulic cylinder, the moveable plate being moveable from a position wherein the shearing edge is proximate the rear of the charge box to a position wherein the shearing edge is proximate the front of the charge box adjacent the apparatus for handling scrap metal, preferably the co-operative movement of the plate, the pusher, and the gate being accomplished by the use of limit or pressure switches; whereby when scrap metal is received within the charge box the moveable plate advances to shear any excess scrap extending through the top of the charge box and thereby engages the co-operative motion of the pusher, to push the scrap into the apparatus for handling scrap metal and the gate which allows the scrap to enter the apparatus for handling scrap metal while preventing the exit of recyclable fumes therefrom.

According to another aspect of the invention, the charging device may comprise a radio controlled dumpster for receiving scrap having a radio receiver to activate the dumpster, the radio receiver activated by a co-generative remote radio transmitter, the radio receiver for activating actuation means preferably hydraulic cylinders to dump the contents of the dumpster into a charge box. The scrap being dumped may therefore be inspected for contaminants and dumped by a single operator.

According to yet another aspect of the invention, the charging device may comprise minimum clearance between the pusher frame and the pusher. Such a design minimizes the risk of scrap wedging in between the two components and minimizing wear and tear on the machine.

According to another aspect of the invention, the charging device may be used in conjunction with the metal prior to being charged into a reverberatory furnace, the preheater comprising a charge box having a bottom for receiving scrap metal, a chamber having a bed, the chamber in communication with the charge box at one end and an exit at the other, a pusher for pushing the contents of the charge box into the chamber and thus pushing the contents of the chamber towards the exit, the chamber of uniform expanding dimensions from its one end in communication with the charge box towards the exit so as to permit the pushing of the scrap metal in the one direction away from the charge box to the exit without undue compression of the scrap metal or jamming of the scrap metal in the chamber, the bed having a plurality of openings therethrough for passing heated gases into the chamber for preheating the scrap and the bed being oriented from the charge box to the exit in a fixed position selected from a range of fixed positions between being fixed and being inclined slightly upwardly from the charge box to the exit to being fixed and being inclined slightly downwardly from the charge box to the exit and when the bed is fixed and inclined slightly downwardly from the charge box to the exit, the bed carries a drain between the charge box and exit proximate the exit for draining any water falling from the scrap to the bed from the chamber.

BRIEF DESCRIPTION OF THE DRAWINGS

The invention will now be illustrated with reference to embodiments of the invention disclosed in the accompanying drawings in which:

FIGS. 10 through 13 inclusive illustrate the use of the preheater shown in the previous drawings.

FIGS. 14 and 15 are schematics illustrating the disposition of the preheater.

FIGS. 16 and 17 illustrate a number of different beds for the chamber of the preheater and their construction according to other embodiments of the invention.

DETAILED DESCRIPTION OF THE EMBODIMENTS

Figure 1:
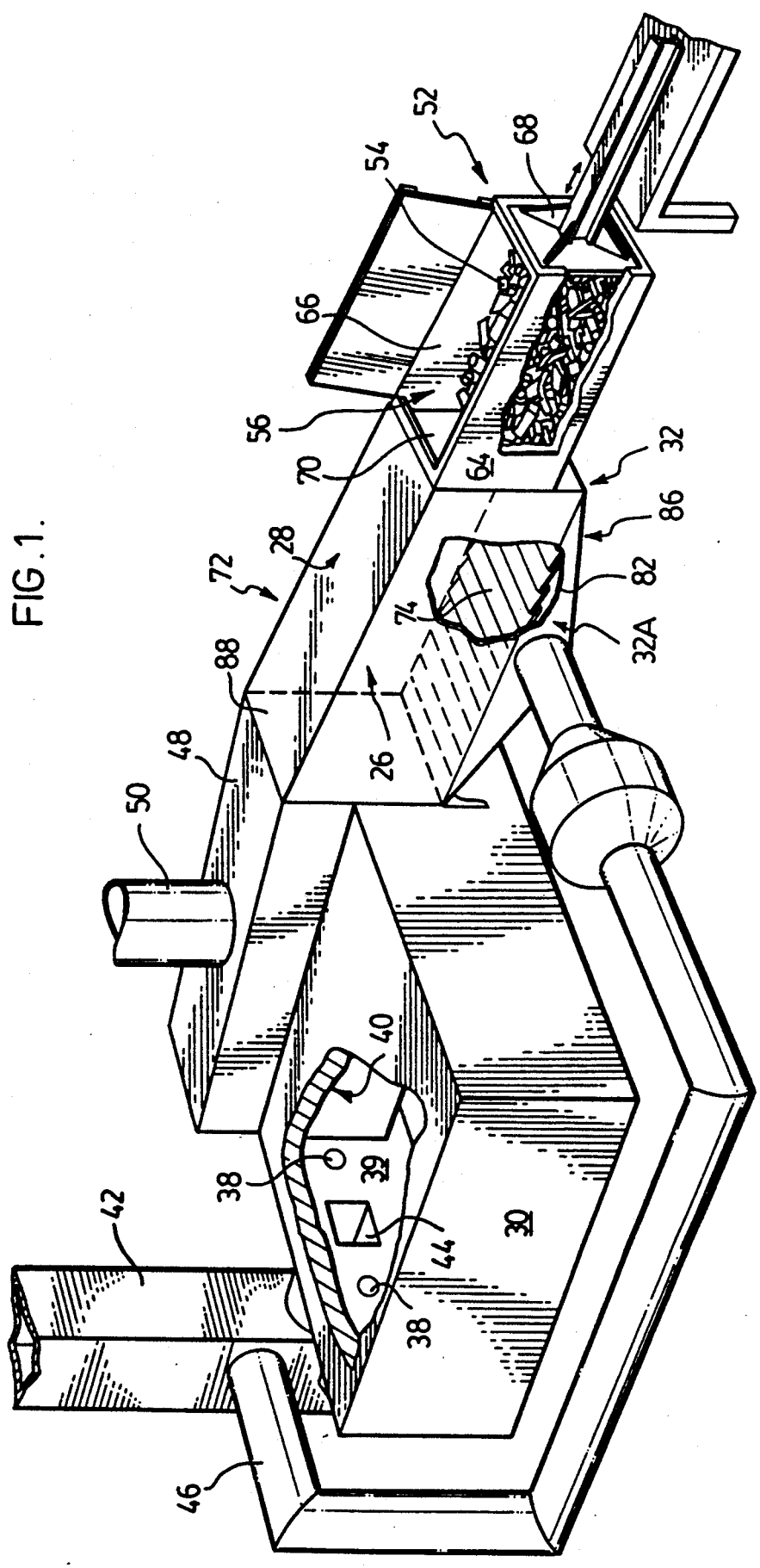
FIG. 1 is a perspective view of a preheater and gas fired reverberatory furnace with portions removed, with the preheater constructed according to a preferred embodiment of the invention.
Figure 2:
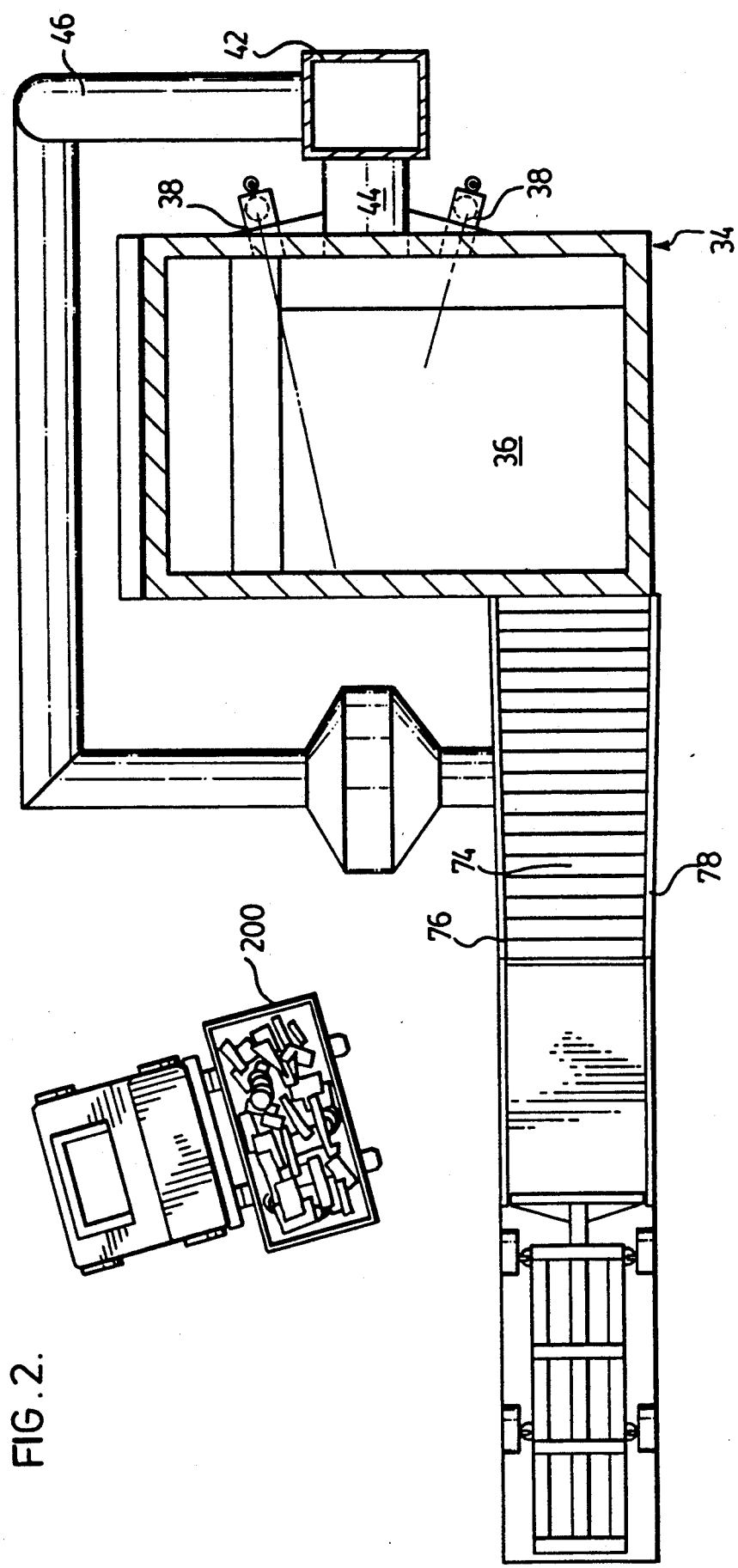
FIG. 2 is a top plan view of the structure shown in FIG. 1.
Figure 3:
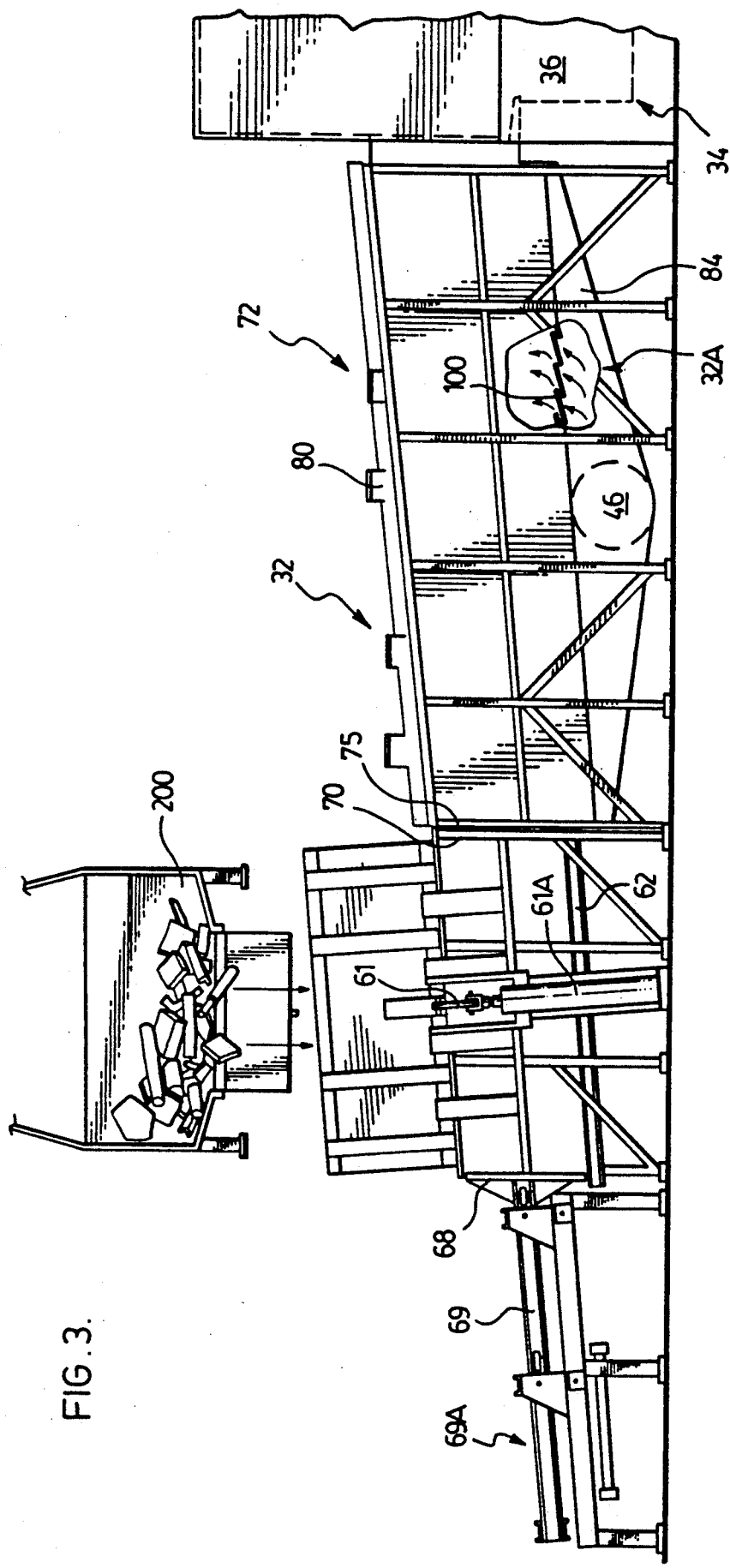
FIG. 3 is a side view of the preheater in FIG. 1 (with a portion removed).
Figure 4:
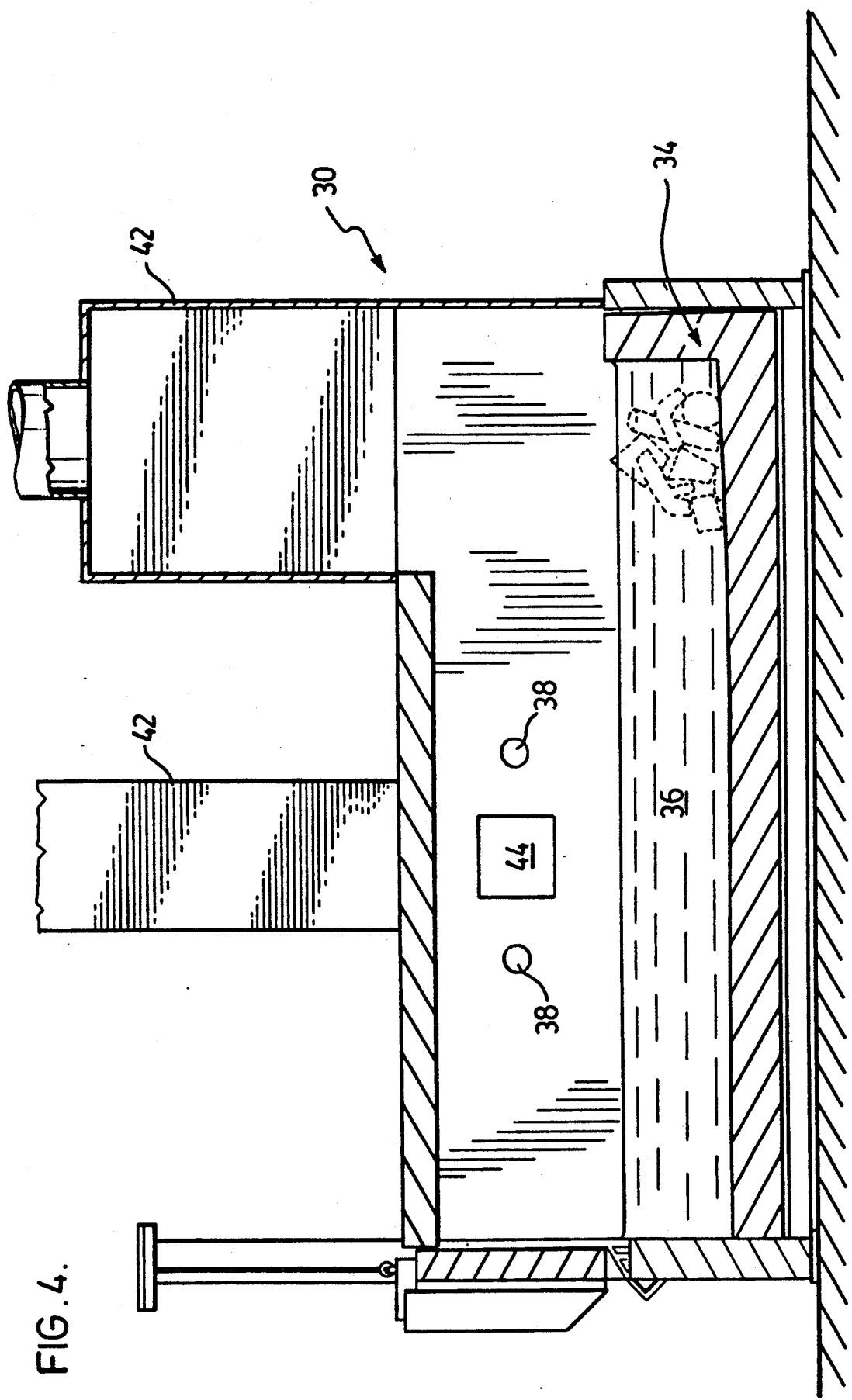
FIG. 4 is a side sectional view of the reverberatory furnace shown in FIGS. 1 and 2.

With reference to FIGS. 1, 2, 3, and 4, there is shown gas fired reverberatory furnaces 30 and preheater 32 for preheating aluminum scrap metal before introducing the metal into the furnace 30.

Reverberatory furnace 30 comprises a well 34 (see FIG. 4) for carrying a molten metal pool of aluminum metal 36. The pool 36 is heated by gas fired burners 38 supported in the walls 39 of the furnace 30 which burners 38 heat the environment over the pool below the roof 40 of the furnace. Much of the generated heat is radiated into the well 34. A large amount of the heat generated is lost up the stack 42 through exhaust outlet 44. Some of the exhaust gases is taken off through tubing 46 and injected into lower portion or lower chamber 32A of preheater 32. The roof 40 of furnace 30 does not extend entirely over well 34. Therefore, well 34 comprises a portion not covered by roof 40 supported by walls 39. That portion is covered by hood 48 from which extends exhaust stack 50.

Figure 5:
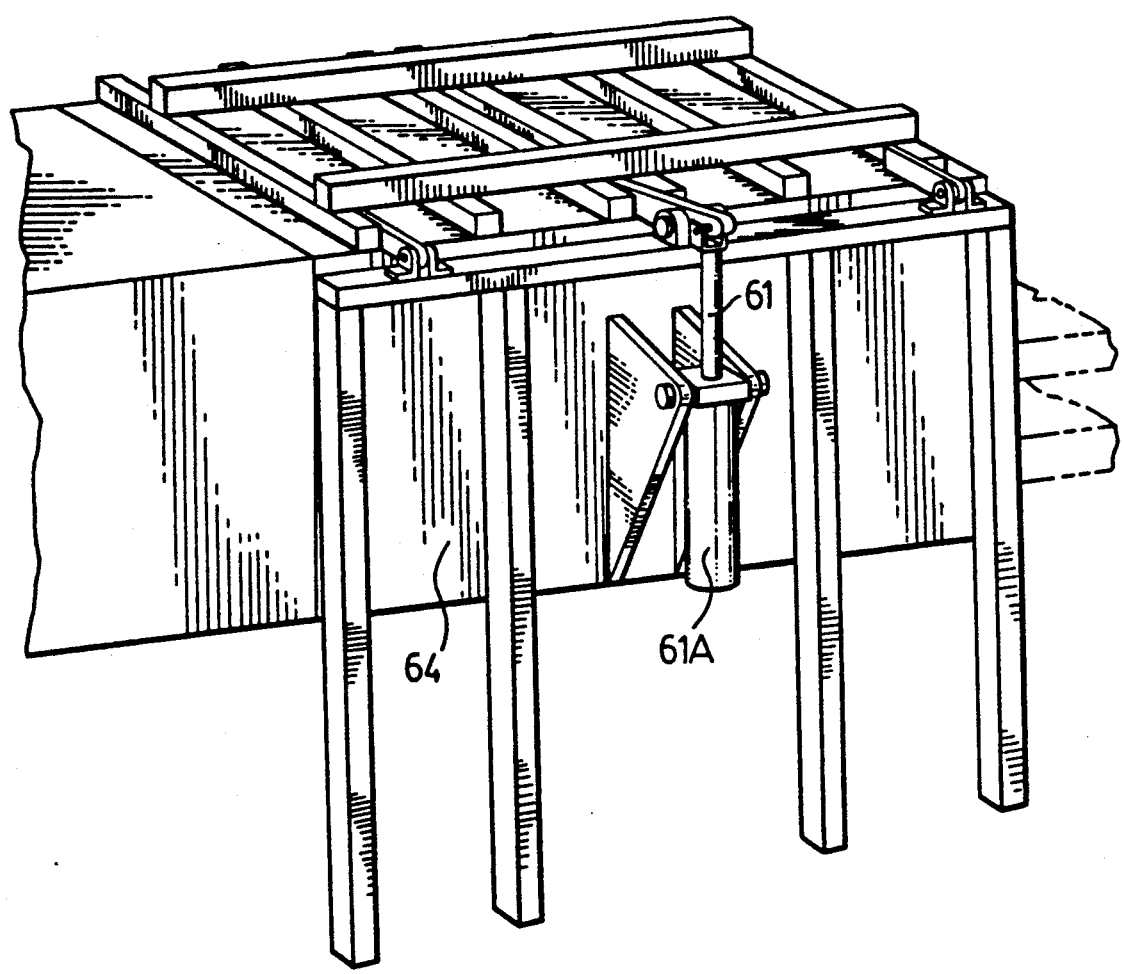
FIG. 5 is a close-up view of part of the structure shown in FIG. 1.
Figure 6:
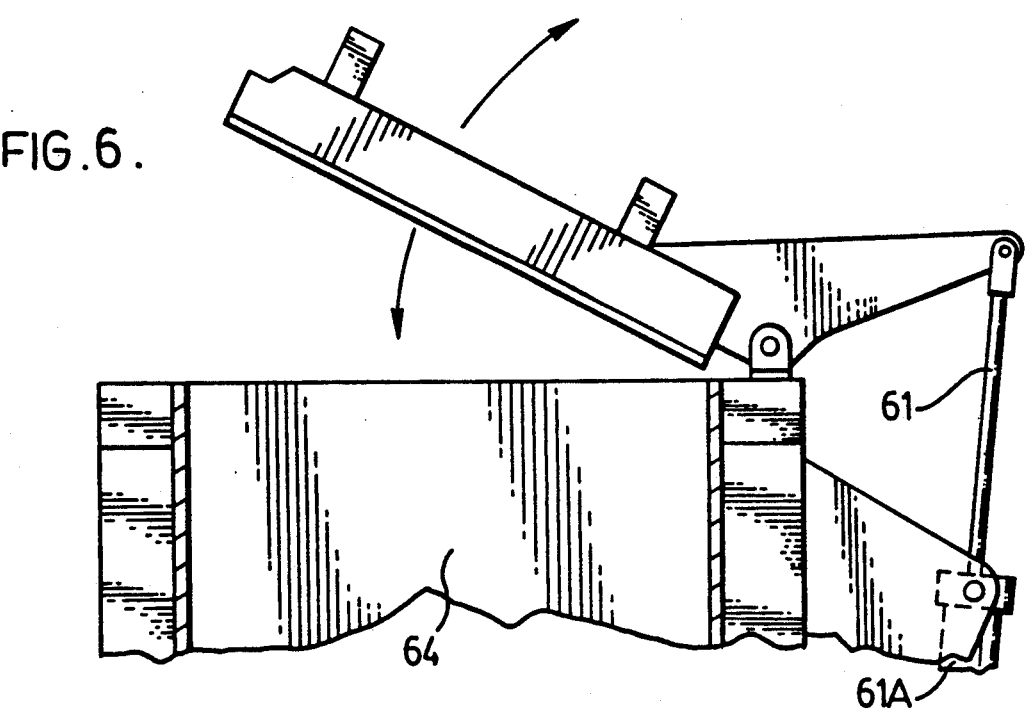
FIG. 6 is a side view of part of the structure shown in FIG. 5 and its operation.
Figure 7:
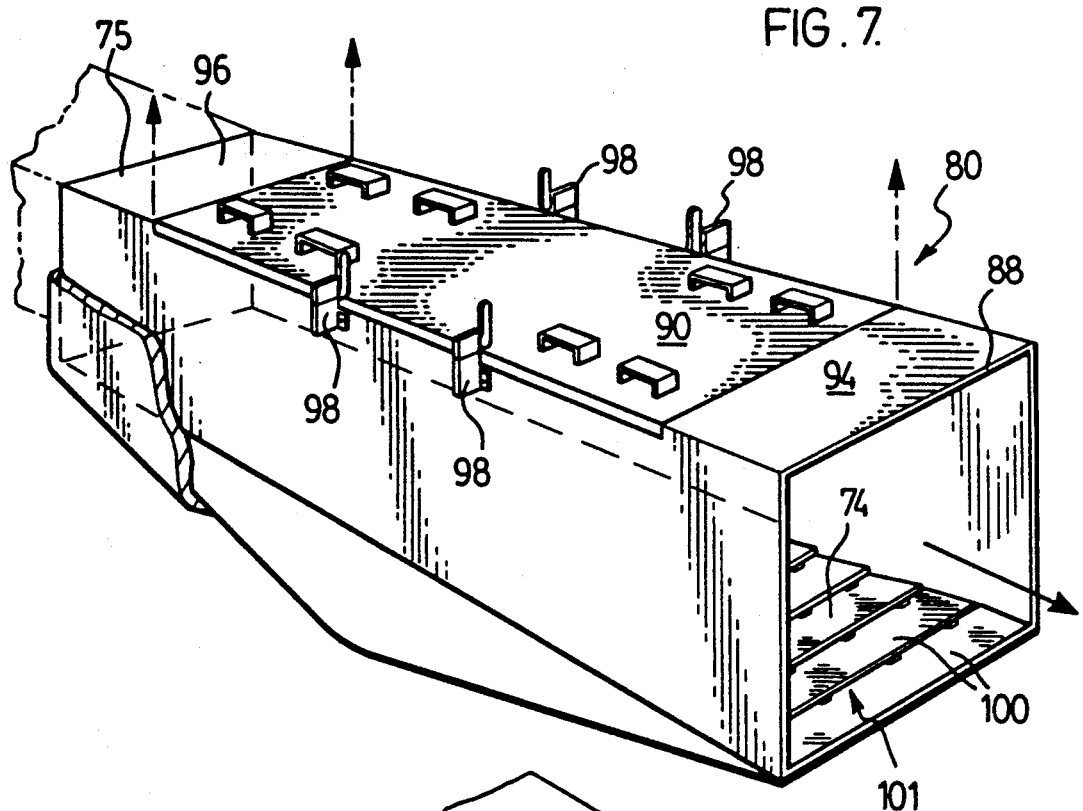
FIG. 7 is an end perspective view of the chamber of the preheater shown in FIG. 1.
Figure 8:
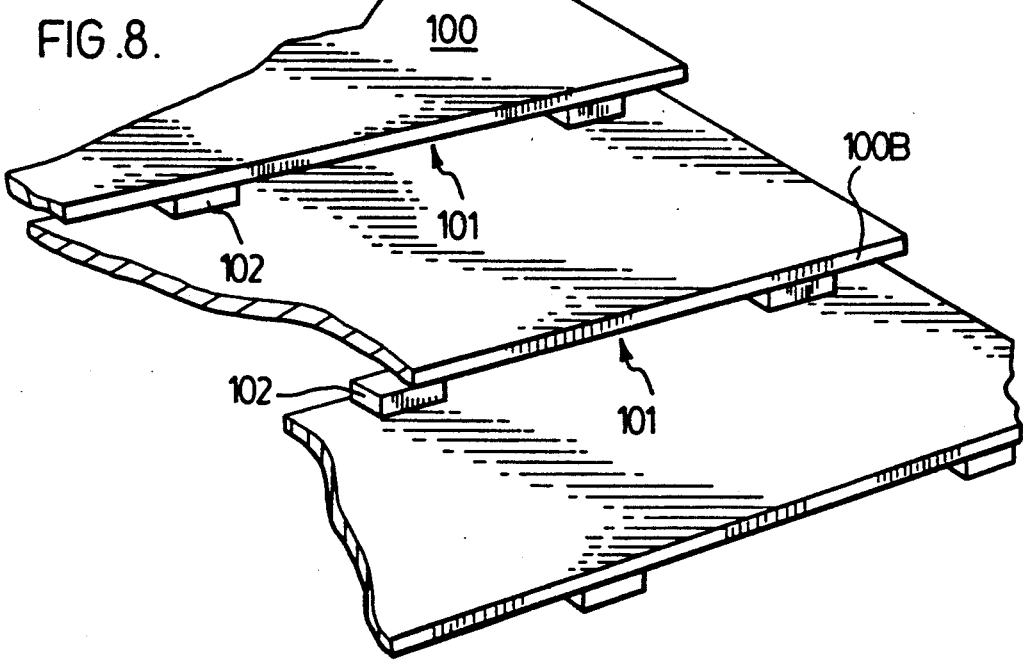
FIG. 8 is a close-up view of the bed of the chamber shown in FIG. 7.

Preheater 32 comprises charge box 52 (10 feet, 7 inches in length [322.6 cm]) for receiving aluminum scrap metal 54 (see FIG. 1) through the top opening 56 closed by pivotable top 58 hinged at 60 (see FIG. 5) and pivoted by rod 61 as it moves into and out of hydraulic cylinder 61A to pivotably open or close top opening 56 at about hinges 60. Charge box 52 comprises flat unperforated bottom 62 (see FIG. 3) and upstanding side walls 64 and 66. Hydraulically operated pusher or ram 68 is disposed at one end of charge box 52 closing that end and reciprocal from that end into the volume of the charge box. Therefore, pusher 68 substantially fills the cross-sectional area of charge box 52. Pusher 68 is secured by I-beam 69 to hydraulic cylinder [Vickers Hydraulic Power Unit (maximum 2,000 p.s.i.)] at 69A to be reciprocated thereby. Together pusher 68 and cylinder 69A occupy 12 feet in length. As pusher 68 advances into charge box 52 it pushes the contents out end 70 into enclosed chamber 72 through opening 75. Chamber 72 (12 feet 4 inches in length [375.9 cm]) comprises bed 74, side walls 76 and 78 and top 80. Bed 74 surmounts lower chamber 32A, V-shaped in cross-section, looking in from tubing 46 (see FIGS. 1 and 3). Chamber 32A comprises upstanding V-shaped side walls 82 (see FIG. 1) and 84 (see FIG. 3) and V-shaped bottom 86 (see FIG. 1). Chamber 72 is of expanding dimensions in both height and width as chamber 72 extends from opening 75 to exit 88. Side walls 76 and 78 increase uniformly in height by 6 inches from opening 75 to exit 88 and bed 74 increases uniformly in width by 6 inches (15.2 cm) from opening 75 to exit 88. Bed 74 is 4 feet 6 inches (137 cm) wide at opening 70. Walls 76 and 78 are 4 feet (122 cm) high at opening 75. Top 80 comprises removeable plate 90 (see FIG. 7) carrying brackets 92 welded thereto for assisting to remove plate 90 [by for example receiving forks of a fork lift (not shown)]. Plate 90 sits on top of side walls 76 and 78 and between fixed rectangular end portions 94 and 96. Plate 90 is removeably secured in position by clamping means 98 fixed to the top of side walls 76 and 78.

Figure 9:
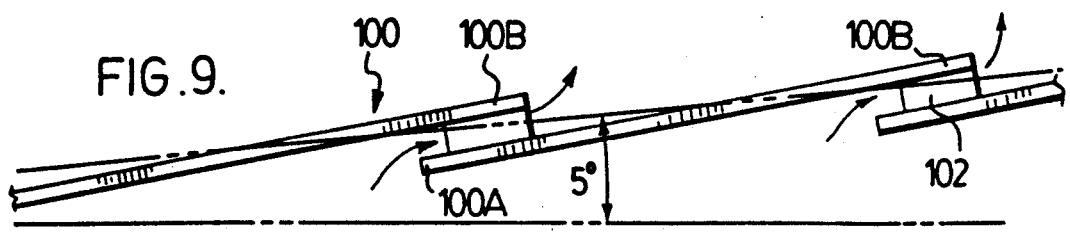
FIG. 9 is a side view of the bed shown in FIG. 8.

Bed 74 is inclined upwardly from opening 75 to exit 88 at an angle of 5 degrees (see FIG. 9) and is made up of a series of plates 100 expanding in width from opening 75 to exit 88 until the last plate proximate exit 88 is 6 inches (15.2 cm) wider than the first plate at opening 75. Each of plates 100 is of constant thickness throughout its length from its rear edge 100A to its front edge 100B (see FIG. 9) and of constant thickness through its width. Except for the last plate 100 of bed 74 at exit 88, the front edge 100B of each plate 100 overlies the rear edge 100A of the plate immediately in front of that plate and is spaced from it by spacer blocks 102 supported by the rear edge 100A of each plate 100 to provide spaces 101.

With reference to FIG. 14, to provide the enlarging dimensions of chamber 72, while bed 74 is angled at 5 degrees to the horizontal, top 80 is angled at 6½ degrees to the horizontal. In the same manner walls 76 and 78 diverge from opening 75 to exit 88. Furthermore, the spacing of walls 76 and 78 is increased from 4 feet 6 inches by 6 inches to 5 feet from opening 75 to exit 88. Their respective heights are also increased by 6 inches from 4 feet at opening 75 to 4 feet 6 inches at exit 88.

In the operation of preheater 32 the volume of charge box 52 is loaded with scrap aluminum (without comminuting or shredding) through top opening 56 after top 58 has been pivoted open and ram 68 retracted to close the end of box 52 remote opening 70 by discharging the contents of container 200 through top opening 56 (see FIGS. 2 and 3) into box 52. Thereafter, and with reference to FIGS. 10 through 14, as waste gas is brought in by tubing 46 into chamber 32A and thus through bed 74 of chamber 32, ram 68 is moved towards opening 70 of charge box 52 pushing the scrap through openings 70 and 75 into chamber 72 where the waste gases introduced into lower chamber 32A pass through the openings 101 between plates 100, through the scrap 54 and out through hood 48 up stack 50. Because of the temperature of the waste gases (up to about 1,000 degrees F.) passing through the metal scrap, the heated metal expands and the water vaporizes or is otherwise dealt with (for example falling through the spaces 101 as a liquid stream from a block of ice). Thereafter, the ram or pusher 68 is retracted, more scrap is loaded into the charge box (see FIG. 12) and that load is pushed into the chamber (see FIG. 13). As the second load is pushed into chamber 72 the second load pushes the first load towards exit 88. As the scrap metal is pushed towards exit 88, because of the continuous enlarging of chamber 72 from opening 75 to exit 88, the expanding metal is permitted to move in a manner so that jamming of the scrap in the chamber or compression of pieces of metal (so as not to accidentally trap moisture between compressed pieces of metal) is precluded. After the second load is pushed into chamber 72, a third load is emptied into the charge box 52 and pusher 68 is activated to push the third load through openings 70 and 75 engaging the first two loads pushing the leading load through exit 88 into molten pool of metal 36 in well 34 below hood 42 where it changes to its molten state.

With reference to FIGS. 16 and 17, two alternately constructed chambers $72^1$ and $72^{11}$ are disclosed having different beds $74^1$ and $74^{11}$ respectively. With respect to FIG. 16, bed $74^1$ is an upwardly inclined flat metal plate from opening 75 to exit 88 of uniform thickness having apertures therethrough.

With respect to FIG. 17, while bed $74^{11}$ is made up of plates 100 overlying other plates and spaced therefrom, the plane of bed $74^{11}$ declines from opening 75 to exit 88 [although the chamber $72^{11}$ expands in its width and height (expanding dimensions)] at an angle of 6½ degrees while top 80 declines at an angle of 5 degrees, therefore enlarging the interior dimensions of the chamber from opening 75 to exit 88.

Where water melts from the scrap and falls onto bed $74^{11}$, unlike any water falling onto bed 74 or $74^1$ which will trickle to opening 75, water on bed $74^{11}$ if it does not fall between the spaces 101 between plates 100, will drop from plate to plate and (unless earlier vaporized) be collected in drain channel 220 and taken away from well 34.

Figure 18:
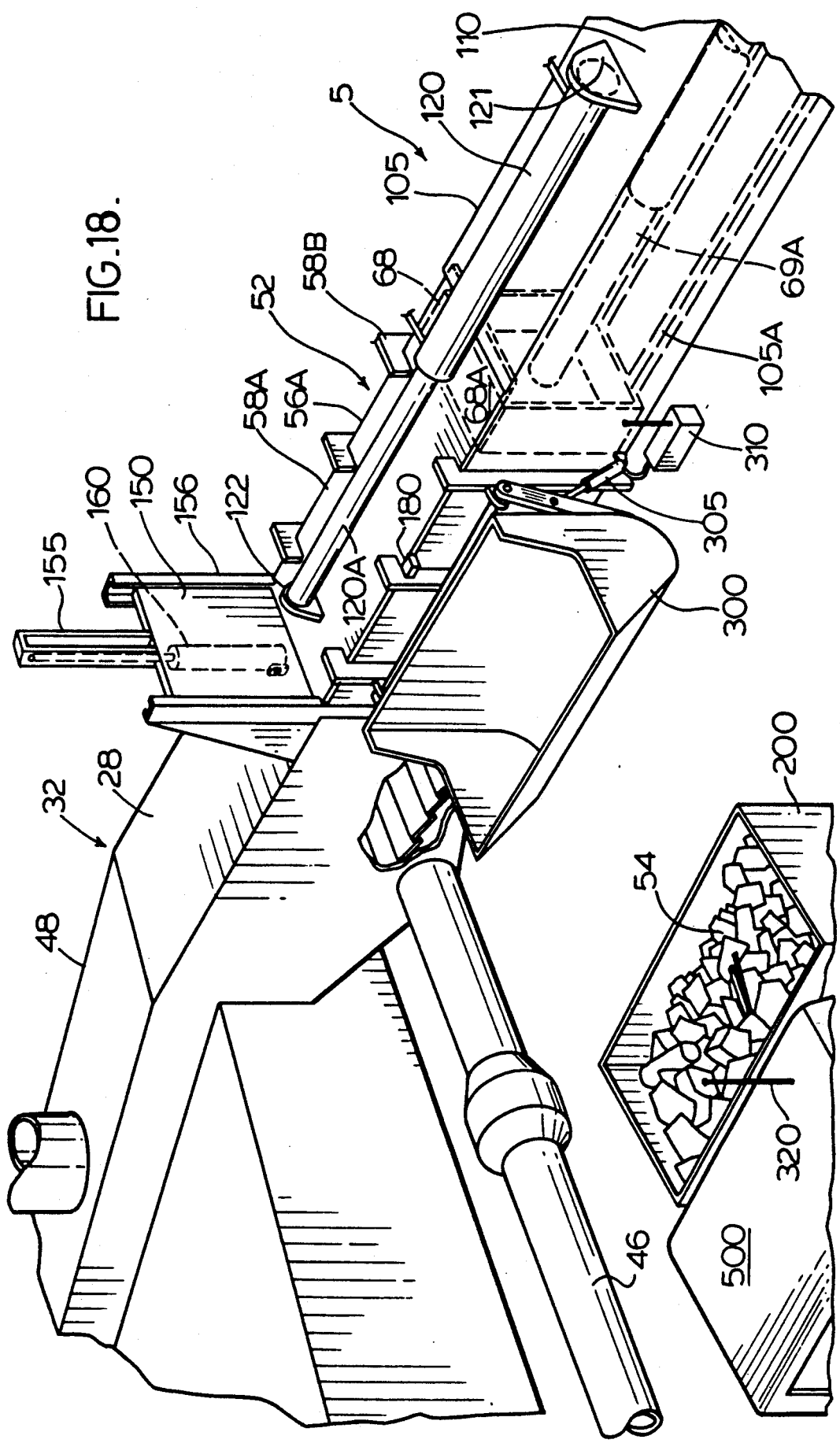
FIG. 18 is a perspective view of the charging device used in conjunction with a preheater according to a preferred embodiment of the invention.

Referring to FIG. 18, charging device 5 is illustrated in perspective for receiving scrap 54 into charge box 52 and having the scrap 54 being forced by pusher 68 motivated by hydraulic cylinder 69A into preheater 32. Charging device 5 comprises a charge box 52 having a ram 68A extending from the face thereof. The pusher 68 and cylinder 69A are enclosed fully by an enclosed housing 105, the enclosed housing for protecting and guiding the movement of the cylinder and the ram, upon track 105A upon the bottom of enclosed housing 105 and by the close tolerances between the edges of ram 68 and the interior walls of enclosed housing 105. It is essential that these close tolerances be maintained in the construction of the enclosed housing in order to ensure the proper alignment of the ram 68 with continuous use. The close alignment is also important as it prevents wedging of scrap materials between the edges of ram 68 and the enclosed housing 105 or the charge box 52. The wedging of scrap materials will of course increase friction and wear and hence, maintenance of the unit. Adjacent the enclosed housing and the ram 68 is disposed a charge box 52 having a top 58A. The top 52A is retained within brackets 58B used to both reinforce the charge box 52 and provide guide channels for top 58A, top 58A being moveable from a position fully retained within the enclosed housing 105 to a position as illustrated in FIG. 18. Cylinder 120 is provided affixed to enclosed housing 105 at fastening point 121 and affixed to top 58A at fastening point 122, thereby providing the force to allow plate 58A to move from its position fully retained within enclosed housing 105 to fully extending over the charge box 52 as illustrated in FIG. 18.

A radio controlled dumpster 300 being hydraulically lifted by cylinder 305 is illustrated in FIG. 18 in an empty condition about to receive the scrap material 54 from truck 500 contained in material handling box 200.

A gate 150 is disposed at one end of the charge box proximate the preheater 32. The gate is inclinded vertically and moves within track 156. Cylinder 160 is provided secured within bracket 155 to provide the force required to move gate 150 up and down. Limit switch 180 is provided upon the top of charge box 52 intermediate the preheater 32 and the enclosed housing 105 for sensing the movement of plate 58A and thereby co-ordinating the movement of ram 68 and gate 150.

Figure 19:
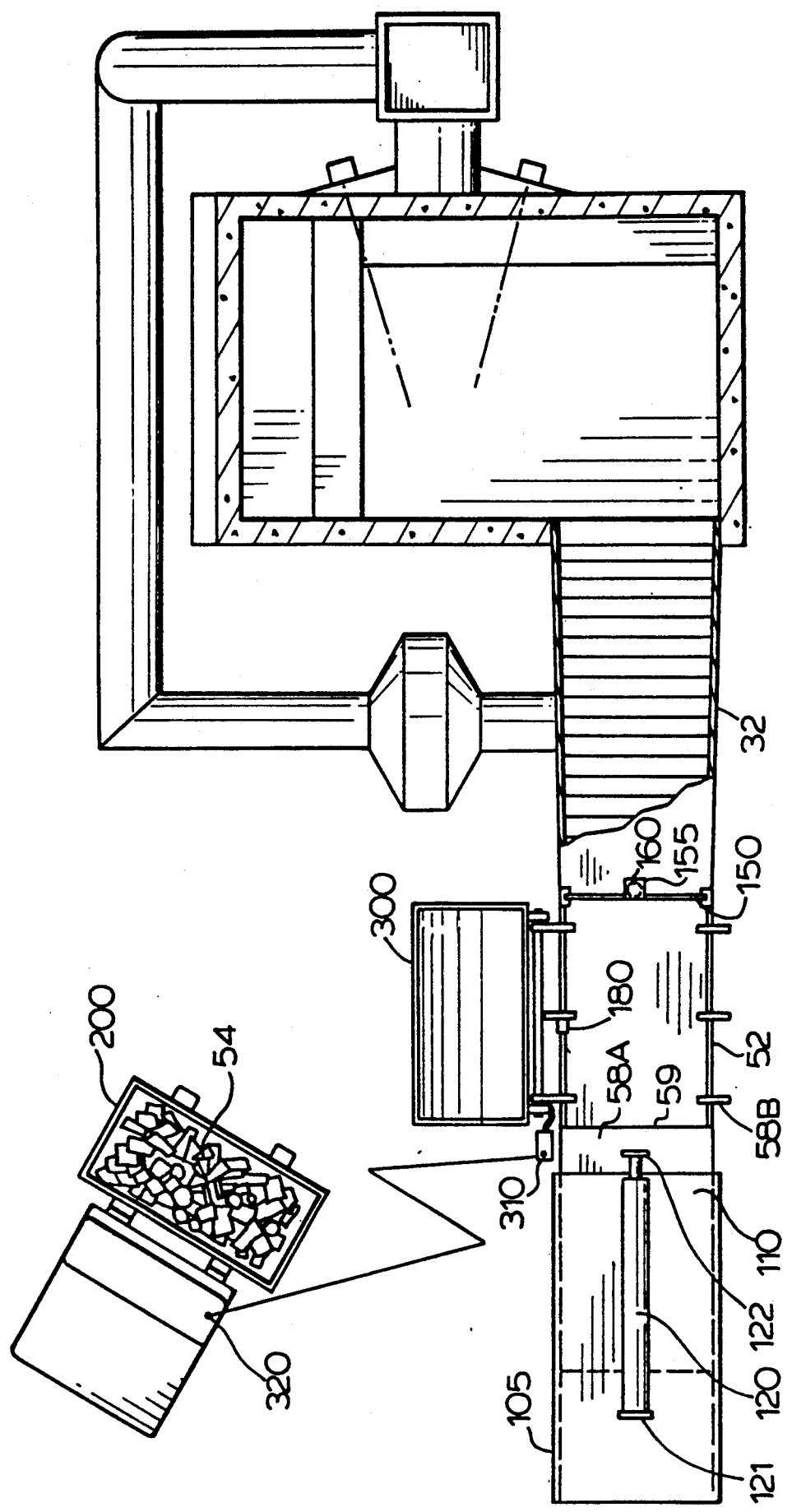
FIG. 19 is a top view of the structure illustrated in FIG. 18.

Referring to FIG. 19, the structure of FIG. 18 is illustrated in top view depicting the cover plate 58A in a fully withdrawn position within enclosed housing 105. Plate 58A has a leading shearing edge 59 which moves from a position adjacent the interface of charge box 52 and enclosure 105 to a position proximate the preheater 32 at gate 150. Brackets 58B conveniently provide a number of support points to support plate 58A as it moves from one position to another. Limit switch 180 is provided on the top edge of charge box 52 so that it will be engaged by the shearing edge 59 of top plate 58 as it moves past. The limit switch will energize the ram 68 and the gate 150 via a control device (not illustrated) to provide a sequence of events and control the charging process of preheater 32 while ensuring that recycled gases for the most part remain within the preheater. As illustrated in FIG. 19 the radio truck operator will be in communication with the radio controlled device 310 which will activate dumpster 300. Cover plate 58A is preferably to be manufactured from two inch mild steel plate having considerable strength to shear any scrap metal which may come within its path.

Figure 20:
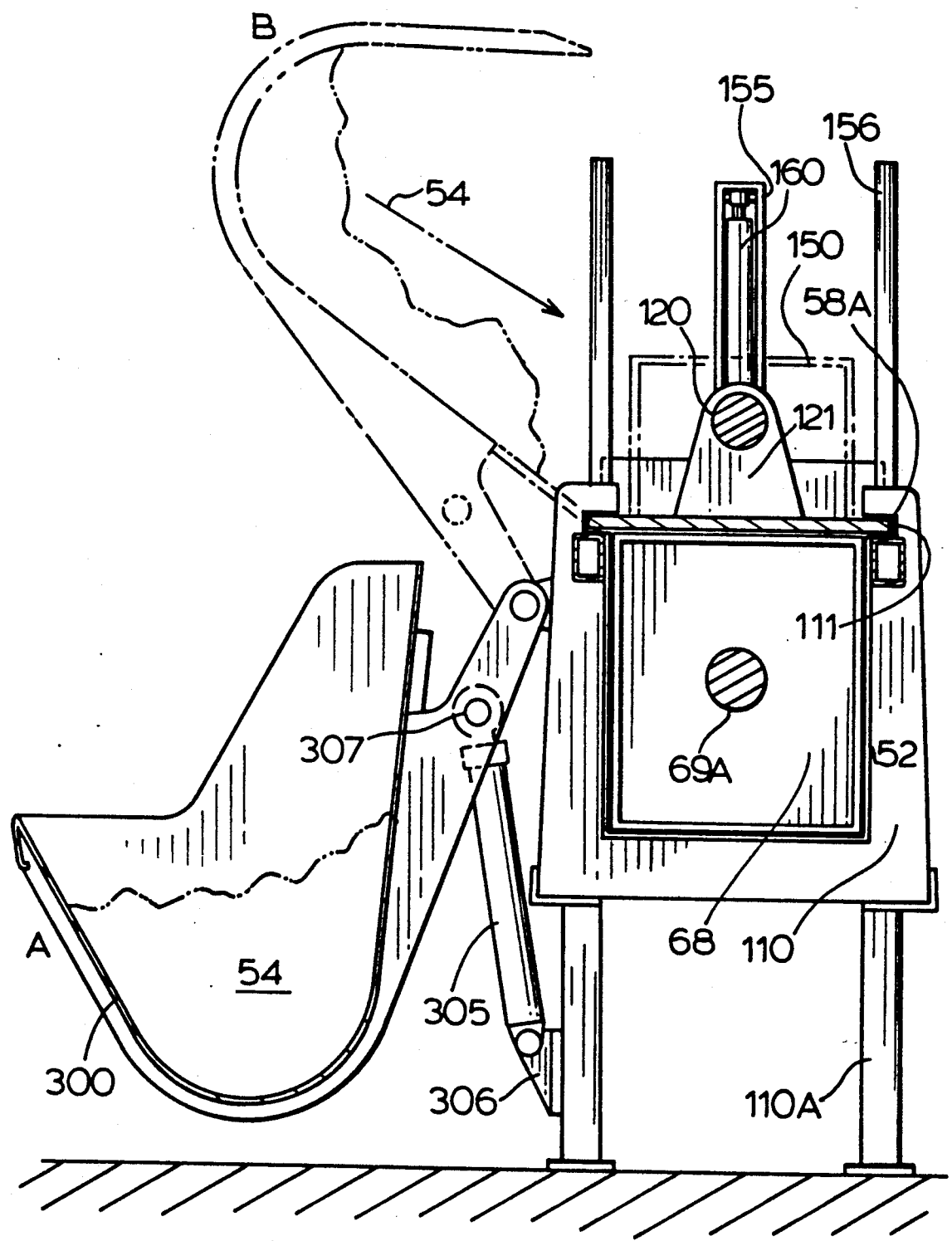
FIG. 20 is a rear view of the structure illustrated in FIGS. 18 and 19 in a preferred embodiment of the invention.

Referring now to FIG. 20, scrap 54 is illustrated positioned within dumpster 300. Dumpster 300 is shown at its lowest position and about to be dumped as activated by the operator within vehicle 500 when transmitter 320 activates radio device 310 causing the hydraulic cylinder 305 to extend, the hydraulic cylinder being affixed at knuckle 307 to the dumpster 300. The dumpster will then be moved to position B wherein scrap 54 will enter the open top of charge box 52. Plate 58A will be fully retained within enclosed housing 105 as illustrated in FIG. 19, thereby allowing the contents of dumpster 300 to be dumped into the opening of charge box 52. Enclosed housing 105 is supported by legs 110A and has track guides 111 disposed on the top thereof for supporting plate 58A in its movement.

Figure 21:
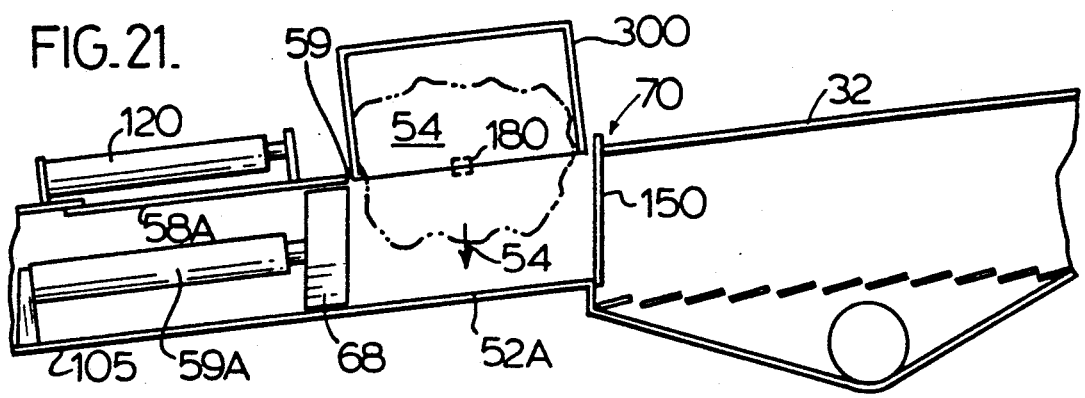
FIGS. 21 through 24 are illustrations of the structure of FIG. 18 showing a side view thereof and illustrating a sequence of events from the charging of scrap metal through the insertion of the scrap metal into a preheater in a preferred embodiment of the invention.

Referring now to FIGS. 21 through 24, a sequence of events is illustrated to describe the positioning of the ram, the gate and the plate and the inter-relationships thereof as scrap metal 54 is charged into the charge box, pushed by the pusher into the preheater 32 and the charge box is then recycled for receipt of a new charge of scrap material. FIG. 21 illustrates the pusher or ram 68 and the cylinder 59A in a fully retracted position within enclosed housing 105 with the plate 58A also at a fully retracted position within enclosed housing 105, supported by tracks 111 and the corresponding cylinder 120 thereof, also at a fully retracted position. Dumpster 300 is actuated by radio control device 310 and is moving from a position A as illustrated in FIG. 20 to a position B as illustrated in FIG. 20, whereby the scrap 54 is charged into charge box 62 and falls to the bottom 62A. Gate 150 is illustrated in a closed position closing off and preventing the escape of the recycled fumes.

Figure 22:
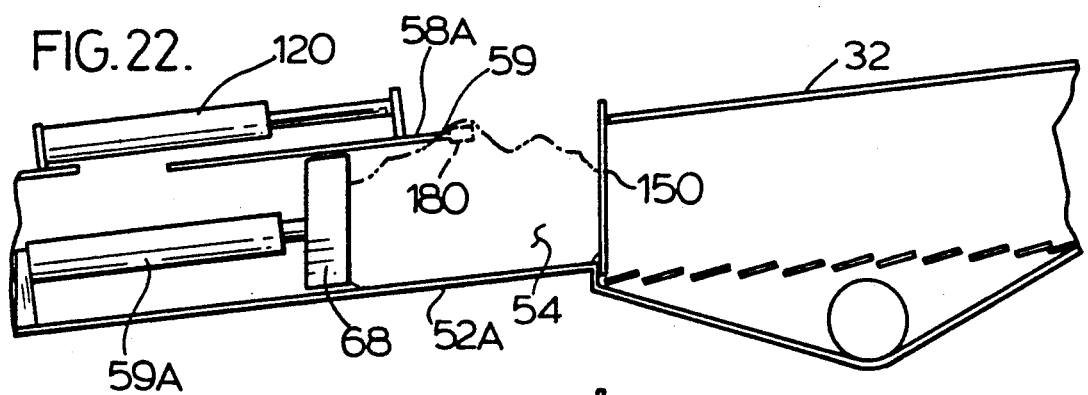

FIG. 22 illustrates the movement of plate 58A once the scrap 54 has been charged within charge box 52. Shearing edge 59 of plate 58A reaches the limit switch 180 which is thereby energized and sends a signal to the control device (not shown) which thereafter controls the sequence of events. It is understood that the movement of cover 58A may be manually, electrically, or radio controlled as best fits the needs of the process. Shearing edge 59 as it advances will shear any scrap metal which may extend beyond the top of the charge box 52 as denoted by scrap material 54A which has been sheared by the top 58A by the advancing shearing edge 59 and the abuttment therewith by gate 150. By edge 59 shearing any materials not contained within the charge box, the scrap material will not offer as much resistance when pushed by pusher 68 into preheater 32. Such action further prevents the buckling of the top plate 58A upon repeated cycles unlike a conventional hinged top device.

Figure 23:
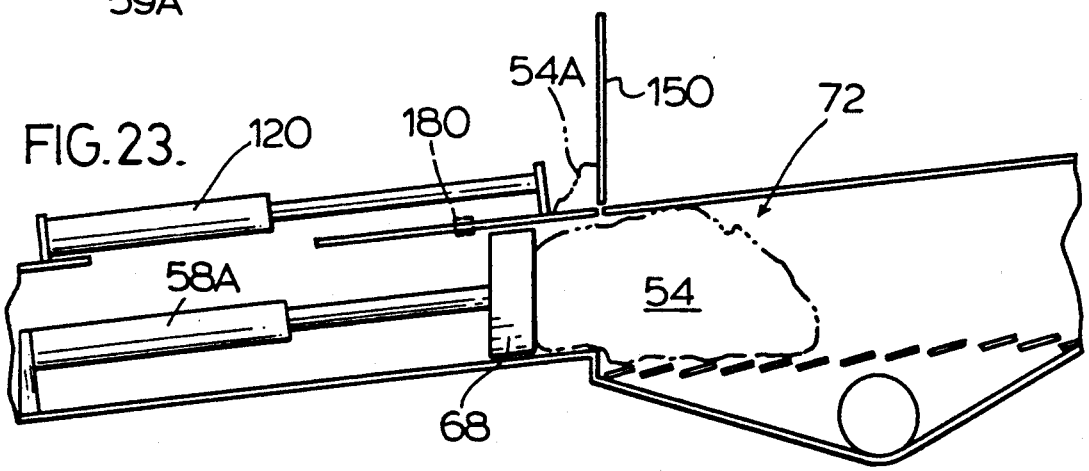
Figure 24:
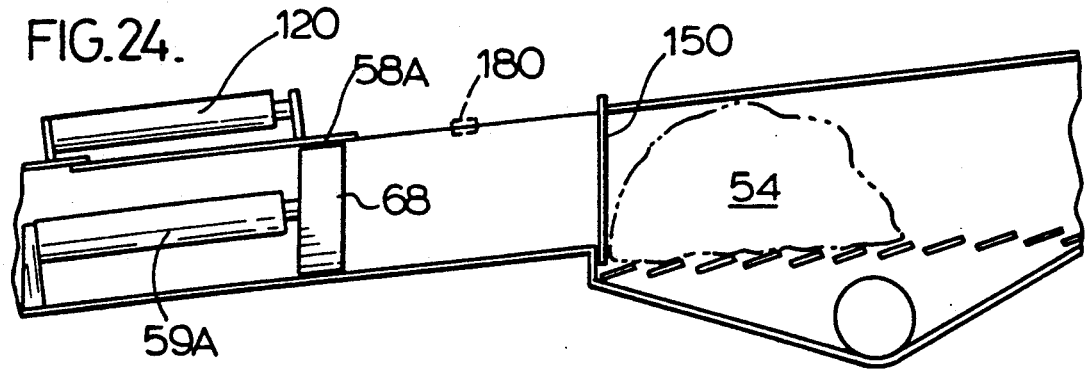

FIG. 23 illustrates ram or pusher 68 advancing while consecutively, gate 150 is raised thereby allowing entrance of scrap 54 into preheater 32. Cover plate 58A is in a fully extended position, thereby minimizing the amount of cold air entering the preheater 32 or conversely, the exit of recycled fumes from preheater 32. Once scrap material 54 is fully contained within preheater 32, ram or pusher 68 recycles to its original position. The gate 150 closes thereby retaining the fumes within preheater 32, and cover 58A further cycles to its original position wherein the charging device is in a position to receive scrap material and repeat the cycle.

As many changes can be made to the embodiments without departing from the scope of the invention, it is intended that all matter contained herein be interpreted as illustrative of the invention and not in a limiting sense.

The embodiments of the invention in which an exclusive privilege or property is claimed are as follows:

1. A changing device suitable for use in processing scrap comprising a charge box open at the top, a pusher, and a separate moveable plate, separate from the pusher and moveable in advance of the pusher, and separately supported for sliding movement from a position with the charge box open to a position to close the charge box;

the charge box having a top, bottom, front and rear, the charge box for receiving scrap through the top thereof and being in communication at the front thereof with an apparatus for handling scrap;

the scrap being pushed by the pusher for pushing the contents of the charge box into the apparatus for handling scrap, the pusher being moveable from a position at the rear of the charge box remote the apparatus for handling scrap to a position at the front of the charge box proximate the apparatus for handling scrap;

the pusher being supported by a support frame fully enclosing the pusher, when the pusher is remote the apparatus for handling scrap;

the separate moveable plate having a shearing edge at its leading edge and for separate co-operative movement with, and in advance of the pusher, the separate moveable plate being separately moveable in advance of the pusher from a position wherein the shearing edge is proximate the rear of the charge box to a position wherein the shearing edge is proximate the front of the charge box adjacent the apparatus for handling scrap.

whereby when scrap is received within the charge box, the separate moveable plate separately advances to shear any excess scrap extending through the top of the charge box in advance of the pusher and thereby effects co-operative motion of the pusher to push the scrap into the apparatus for handling scrap.

2. A charging device suitable for use in processing scrap comprising a charge box open at the top, a pusher, a moveable gate, and a separate moveable plate, separate from the pusher and moveable in advance of the pusher, and separately supported for sliding movement from a position with the charge box open to a position to close the top of the charge box;

the charge box having a top, bottom, front and rear, the charge box for receiving scrap through the top thereof, and being in communication at the front thereof with an apparatus for handling scrap;

the scrap being pushed by the pusher for pushing the contents of the charge box into the apparatus for handling scrap, the pusher being moveable from a position at the rear of the charge box remote the apparatus for handling scrap to a position at the front of the charge box proximate the apparatus for handling scrap;

the pusher being supported by a support frame fully enclosing the pusher when the pusher is remote the apparatus for handling scrap;

the charge box having disposed at the front thereof and inclined substantially vertically, a gate having a bottom for co-operative movement with the pusher, the movement being from a position wherein the bottom of the gate is proximate the bottom of the charge box to a position wherein the bottom of the gate is proximate the top of the charge box;

the separate moveable plate having a shearing edge at its leading edge and for separate co-operative movement with, and in advance of the pusher and the gate, the separate moveable plate being separately moveable in advance of the pusher from a position wherein the shearing edge is proximate the rear of the charge box to a position wherein the shearing edge is proximate the front of the charge box adjacent the apparatus for handling scrap;

whereby when scrap is received within the charge box, the separate moveable plate separately advances to shear any excess scrap extending through the top of the charge box in advance of the pusher and thereby effects the co-operative motion of the pusher, to push the scrap into the apparatus for handling scrap, and the gate which allows the scrap to enter the apparatus for handling scrap while preventing the exit of fumes therefrom.

3. The charging device of claims 1 or 2, wherein the pusher comprises a rectangular plate extending substantially vertically from the top to the bottom of the charge box, and from one side to the other side of the charge box.

4. The charging device of claims 1 or 2, wherein the pusher is advanced by a hydraulic cylinder attached centrally to the pusher on the side of the pusher remote the charge box.

5. The charging device of claims 1 or 2, wherein the separate moveable plate is slideable within a track and moveable by a hydraulic cylinder.

6. The charging device of claim 2, wherein the movement of the substantially vertical gate from a position wherein the bottom of the gate is proximate the bottom of the charge box to a position wherein the bottom of the gate is proximate the top of the charge box, is coincident with the pusher when the pusher is respectively remote the apparatus for handling scrap metal to a position when the pusher is proximate the apparatus for handling scrap.

7. The charging device of claim 2, wherein the gate has a substantially vertically inclined hydraulic cylinder and frame therefor affixed proximate the rear of the charge box proximate the apparatus for handling scrap for the supported movement thereof.

8. The charging device of claim 1 or 2, wherein the co-operative movement of the separately moveable components is accomplished by the use of limit or pressure switches.

9. The charging device of claim 1 or 2, further comprising a radio controlled dumpster, said dumpster activated by a radio control signal from a radio transmitter remotely located for receiving and handling scrap into the charge box, said dumpster having a radio receiver for receiving said radio signals to activate actuation means attached to the dumpster, the radio receiver for activating said actuation means attached to the dumpster which when actuated dump the contents of the dumpster into the charge box.

10. The charging device of claim 3, wherein the pusher is advanced by a hydraulic cylinder attached centrally to the pusher on the side of the pusher remote the charge box.

11. The charging device of claim 4, wherein the pusher and the hydraulic cylinder are supported by a support frame, fully enclosing the pusher and the hydraulic cylinder.

12. The charging device of claim 11, wherein the pusher and the hydraulic cylinder are supported by a support frame fully enclosing the pusher and the hydraulic cylinder.

13. The charging device of claim 3, wherein the movement of the substantially vertical gate from a position wherein the bottom of the gate is proximate the bottom of the charge box to a position wherein the bottom of the gate is proximate the top of the charge box, is coincident with the pusher when the pusher is respectively remote the apparatus for handling scrap metal to a position when the pusher is proximate the apparatus for handling scrap.

14. The charging device of claim 4, wherein the movement of the substantially vertical gate from a position wherein the bottom of the gate is proximate the bottom of the charge box to a position wherein the bottom of the gate is proximate the top of the charge box, is coincident with the pusher when the pusher is respectively remote the apparatus for handling scrap metal to a position when the pusher is proximate the apparatus for handling scrap.

15. The charging device of claim 11, wherein the movement of the substantially vertical gate from a position wherein the bottom of the is proximate the bottom of the charge box to a position wherein the bottom of the gate is proximate the top of the charge box, is coincident with the pusher when the pusher is respectively remote the apparatus for handling scrap metal to a position when the pusher is proximate the apparatus for handling scrap.

16. The charging device of claim 12, wherein the movement of the substantially vertical gate from a position wherein the bottom of the gate is proximate the bottom of the charge box to a position wherein the bottom of the gate is proximate the top of the charge box, is coincident with the pusher when the pusher is respectively remote the apparatus for handling scrap metal to a position when the pusher is proximate the apparatus for handling scrap.

17. The charging device of claim 5, wherein the movement of the substantially vertical gate from a position wherein the bottom of the gate is proximate the bottom of the charge box to a position wherein the bottom of the gate is proximate the top of the charge box, is coincident with the pusher when the pusher is respectively remote the apparatus for handling scrap metal to a position when the pusher is proximate the apparatus for handling scrap.

18. The charging device of claim 3, wherein the gate has a substantially vertically inclined hydraulic cylinder and frame therefor affixed proximate the rear of the charge box proximate the apparatus for handling scrap for the supported movement thereof.

19. The charging device of claim 4, wherein the gate has a substantially vertically inclined hydraulic cylinder and frame therefor affixed proximate the rear of the charge box proximate the apparatus for handling scrap for the supported movement thereof.

20. The charging device of claim 11, wherein the gate has a substantially vertically inclined hydraulic cylinder and frame therefor affixed proximate the rear of the charge box proximate the apparatus for handling scrap for the supported movement thereof.

21. The charging device of claim 13, wherein the gate has a substantially vertically inclined hydraulic cylinder and frame therefor affixed proximate the rear of the charge box proximate the apparatus for handling scrap for the supported movement thereof.

22. The charging device of claim 5, wherein the gate has a substantially vertically inclined hydraulic cylinder and frame therefor affixed proximate the rear of the charge box proximate the apparatus for handling scrap for the supported movement thereof.

23. The charging device of claim 6, wherein the gate has a substantially vertically inclined hydraulic cylinder and frame therefor affixed proximate the rear of the charge box proximate the apparatus for handling scrap for the supported movement thereof.

24. The charging device of claim 14, wherein the gate has a substantially vertically inclined hydraulic cylinder and frame therefor affixed proximate the rear of the charge box proximate the apparatus for handling scrap for the supported movement thereof.

25. The charging device of claim 15, wherein the gate has a substantially vertically inclined cylinder and frame therefor affixed proximate the rear of the charge box proximate the apparatus for handling scrap for the supported movement thereof.

26. The structure of claim 9, wherein the actuation means comprises hydraulic cylinders to dump the contents of the dumpster into a charge box.

* * * * *